United States Patent
Jung et al.

(10) Patent No.: US 10,041,391 B2
(45) Date of Patent: Aug. 7, 2018

(54) APPARATUS FOR PURIFYING EXHAUST GAS

(71) Applicant: HYUNDAI MOTOR COMPANY, Seoul (KR)

(72) Inventors: ChangHo Jung, Osan-si (KR); Pyung Soon Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 36 days.

(21) Appl. No.: 15/299,007

(22) Filed: Oct. 20, 2016

(65) Prior Publication Data
US 2017/0362978 A1   Dec. 21, 2017

(30) Foreign Application Priority Data
Jun. 20, 2016   (KR) .......................... 10-2016-0076781

(51) Int. Cl.
*F01N 3/08* (2006.01)
*F01N 3/035* (2006.01)
(Continued)

(52) U.S. Cl.
CPC ....... *F01N 3/0814* (2013.01); *B01D 53/9422* (2013.01); *B01D 53/9477* (2013.01); *B01J 23/63* (2013.01); *F01N 3/035* (2013.01); *F01N 3/0842* (2013.01); *F01N 3/2066* (2013.01); *F01N 3/28* (2013.01); *F01N 13/009* (2014.06); *B01D 2255/1021* (2013.01);
(Continued)

(58) Field of Classification Search
None
See application file for complete search history.

(56) References Cited

U.S. PATENT DOCUMENTS

2010/0037600 A1* 2/2010 Doring .................. F01N 3/0222
                                                          60/297
2011/0173950 A1* 7/2011 Wan .................... B01D 53/9472
                                                          60/274
(Continued)

FOREIGN PATENT DOCUMENTS

JP    2003-307113 A    10/2003
JP    2013-032706 A     2/2013
(Continued)

*Primary Examiner* — Walter Dean Griffin
*Assistant Examiner* — Jelitza M Perez
(74) *Attorney, Agent, or Firm* — McDermott Will & Emery LLP

(57) ABSTRACT

An apparatus includes a catalytic converter on an exhaust pipe and provided with a lean NOx trap (LNT) device coated with an LNT catalyst, and a catalyzed particulate filter (CPF) coated with a catalyst. The LNT device and CPF are sequentially disposed in the catalytic converter. The CPF includes at least one inlet channel, extending in a longitudinal direction, having a first end into which fluid flows and a blocked second end; at least one outlet channel, extending in the longitudinal direction, having a blocked first end and a second end through which the fluid flows out; at least one porous wall defining a boundary between neighboring inlet and outlet channels and that extends in the longitudinal direction; and a support coated with the catalyst and located within at least one among the at least one inlet channel and the at least one outlet channel.

6 Claims, 6 Drawing Sheets

(51) Int. Cl.
  *B01D 53/94*     (2006.01)
  *B01J 23/63*     (2006.01)
  *F01N 3/28*      (2006.01)
  *F01N 3/20*      (2006.01)
  *F01N 13/00*     (2010.01)

(52) U.S. Cl.
  CPC ............... *B01D 2255/2042* (2013.01); *B01D 2255/904* (2013.01); *B01D 2255/91* (2013.01); *B01D 2255/915* (2013.01); *F01N 2610/02* (2013.01)

(56) References Cited

U.S. PATENT DOCUMENTS

2014/0154145 A1* 6/2014 Aoki .................... B01J 35/0006
                                                      422/180
2017/0107878 A1* 4/2017 Brown ..................... F01N 3/20

FOREIGN PATENT DOCUMENTS

| JP | 5749940 B2 | 7/2015 |
| KR | 10-2011-0041502 A | 4/2011 |

* cited by examiner

APPARATUS FOR PURIFYING EXHAUST GAS

CROSS-REFERENCE TO RELATED APPLICATION

This application claims the benefit of priority to Korean Patent Application No. 10-2016-0076781, filed in the Korean Intellectual Property Office on Jun. 20, 2016, the entirety of which is incorporated herein by reference.

TECHNICAL FIELD

The present disclosure relates to an apparatus for purifying an exhaust gas. More particularly, the present disclosure relates to maximizing the purification of nitrogen oxide contained in an exhaust gas at high speed or high load conditions.

BACKGROUND

Generally, exhaust gas flowing out from an engine through an exhaust manifold is driven into a catalytic converter mounted on an exhaust pipe and is purified therein. After this purification, the noise of the exhaust gas is decreased while passing through a muffler and then the exhaust gas is emitted into the air through the tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of catalytic converter, and it purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reaction with the reducing agents.

Recently, a lean NOx trap (LNT) catalyst is used as such a DeNOx catalyst. The LNT catalyst absorbs the NOx contained in the exhaust gas when the air/fuel ratio is lean, and releases the absorbed NOx and reduces the released nitrogen oxide and the nitrogen oxide contained in the exhaust gas when the air/fuel ratio is rich.

If the temperature of the exhaust gas, however, is high (e.g., the temperature of the exhaust gas is higher than 400° C.), the LNT catalyst cannot purify the nitrogen oxide contained in the exhaust gas. Particularly, if a vehicle runs under high speed or high load conditions, the temperature of the exhaust gas will be high and the LNT catalyst disposed closely to the engine cannot absorb the nitrogen oxide in the exhaust gas. Therefore, the nitrogen oxide in the exhaust gas may be discharged from the LNT catalyst. In addition, since the flow of the exhaust gas is greater under high acceleration or high load conditions, NOx exhausted to the exterior of the vehicle may be increased. Therefore, the purifying performance of the nitrogen oxide may be greatly deteriorated.

In a catalyzed particulate filter (CPF), a catalyst is coated in the particulate filter to enhance a function of removing the particulate matter or additionally removing the pollutants.

In the CPF, the catalyst is coated on the porous wall that separates the inlet channel and the outlet channel from each other, and the fluid passes through the porous wall and comes into contact with the catalyst coating. There is a pressure difference between the inlet and outlet channels separated by the porous wall. This allows the fluid to pass quickly through the porous wall. Accordingly, the contact time between the catalyst and the fluid is short, which makes it difficult for the catalytic reaction to occur efficiently.

Furthermore, a thick catalyst coating on the porous wall may cause the catalyst to block the micropores on the wall, and this may disturb the flow of the fluid from the inlet channel to the outlet channel. Accordingly, the back pressure increases. To minimize the increase in back pressure, a catalyst is thinly coated on the walls in the CPF. Thus, the amount of catalyst coating on the CPF may be insufficient for the catalytic reaction to occur efficiently.

To overcome this problem, the surface area of the walls to be coated with the catalyst may be increased by increasing the number (density) of inlet channels and outlet channels (hereinafter, collectively referred to as 'cells'). However, the increase in cell density in the limited space reduces the wall thickness. The reduction in wall thickness may deteriorate the filter performance. Therefore, the cell density should not be increased to more than the density limit.

SUMMARY

The present disclosure has been made in an effort to provide an apparatus for purifying an exhaust gas having advantages of removing nitrogen oxide that is not removed at and is exhausted from a lean NOx trap (LNT) device at high temperature or high load driving conditions by disposing the LNT device in which an LNT catalyst is coated close to an engine and disposing a catalyzed particulate filter (CPF) in which an LNT catalyst or an SCR catalyst is coated at downstream of the LNT device.

Another exemplary embodiment in the present disclosure provides an apparatus for purifying an exhaust gas having further advantages of enhancing catalytic function and preventing decrease of filtering efficiency by using a catalyzed particulate filter which can minimize an increase in back pressure and increase catalyst loading.

An apparatus for purifying an exhaust gas passing through an exhaust pipe includes a catalytic converter disposed on the exhaust pipe. The catalytic converter is provided with a lean NOx trap (LNT) device, the LNT device having an LNT catalyst coated therein, and a catalyzed particulate filter (CPF), the CPF having a catalyst coated therein, and the LNT device and the CPF are sequentially disposed in the catalytic converter. The CPF includes at least one inlet channel extending in a longitudinal direction, the at least one inlet channel having a first end into which fluid flows and a second end which is blocked, at least one outlet channel extending in the longitudinal direction, the at least one outlet channel having a first end which is blocked and a second end through which the fluid flows out, at least one porous wall that defines a boundary between neighboring inlet and outlet channels and that extends in the longitudinal direction, and a support with the catalyst coating thereon, and the support is located within at least one among the at least one inlet channel and the at least one outlet channel.

In one exemplary embodiment, the support may be located within the at least one inlet channel and within the at least one outlet channel, and the catalyst may include a first catalyst which is coated on the porous wall and a second catalyst which is coated on the support.

Both of the first catalyst and the second catalyst may be LNT catalysts.

In one aspect, an entirety of the LNT catalyst coated in the LNT device and the first and second catalysts may include ceria ($CeO_2$), platinum (Pt), and barium (Ba), and a content of the ceria respectively in first and second catalysts is at least 10% higher than that in the LNT catalyst coated in the LNT device, and a content of the platinum respectively in the first and second catalysts is 10%-50% higher than that in the LNT device.

In another aspect, an entirety of the LNT catalyst coated in the LNT device and the first and second catalysts may include ceria ($CeO_2$), platinum (Pt), and barium (Ba), and a content of the ceria respectively in the first and second catalysts is at least 10% lower than that in the LNT catalyst coated in the LNT device, and a content of the barium respectively in the first and second catalysts is at least 10% higher than that in the LNT catalyst coated in the LNT device.

In another exemplary embodiment, the support may be located within the at least one outlet channel, and the catalyst includes a first catalyst which is coated on the porous wall and a second catalyst which is coated on the support.

The first catalyst may be an LNT catalyst and the second catalyst may be a selective catalytic reduction (SCR) catalyst.

In some exemplary embodiments, a distance from an outlet of the LNT device to an inlet of the CPF may be less than or equal to 600 mm.

In some exemplary embodiments, the apparatus for purifying the exhaust gas may further include an SCR device disposed on the exhaust pipe downstream of the catalytic converter and provided with an SCR catalyst coated thereon and reducing nitrogen oxide contained in the exhaust gas using ammonia produced in the catalytic converter.

According to exemplary embodiments in the present disclosure, nitrogen oxide that is not removed at and is exhausted from a lean NOx trap (LNT) device at high temperature or high load driving condition may be removed by disposing the LNT device in which an LNT catalyst is coated close to an engine and disposing a catalyzed particulate filter (CPF) in which an LNT catalyst or an SCR catalyst is coated at a downstream of the LNT device. Therefore, purifying efficiency of the nitrogen oxide may be improved.

In addition, catalytic function may be enhanced and decrease of filtering efficiency may be prevented by using a catalyzed particulate filter which can minimize an increase in back pressure and increase catalyst loading.

Furthermore, the nitrogen oxide that is not removed at the LNT device and the CPF may be finally removed by disposing an additional SCR device at a downstream of the apparatus of purifying the exhaust gas. Therefore, strengthened exhaust gas regulations may be met.

Other effects obtainable or predictable from the exemplary embodiments in the present disclosure will be explicitly or implicitly described in a DETAILED DESCRIPTION section. That is, various effects predictable from the exemplary embodiments in the present disclosure will be described in the DETAILED DESCRIPTION section.

DETAILED DESCRIPTION OF THE EMBODIMENTS

Figure 1:
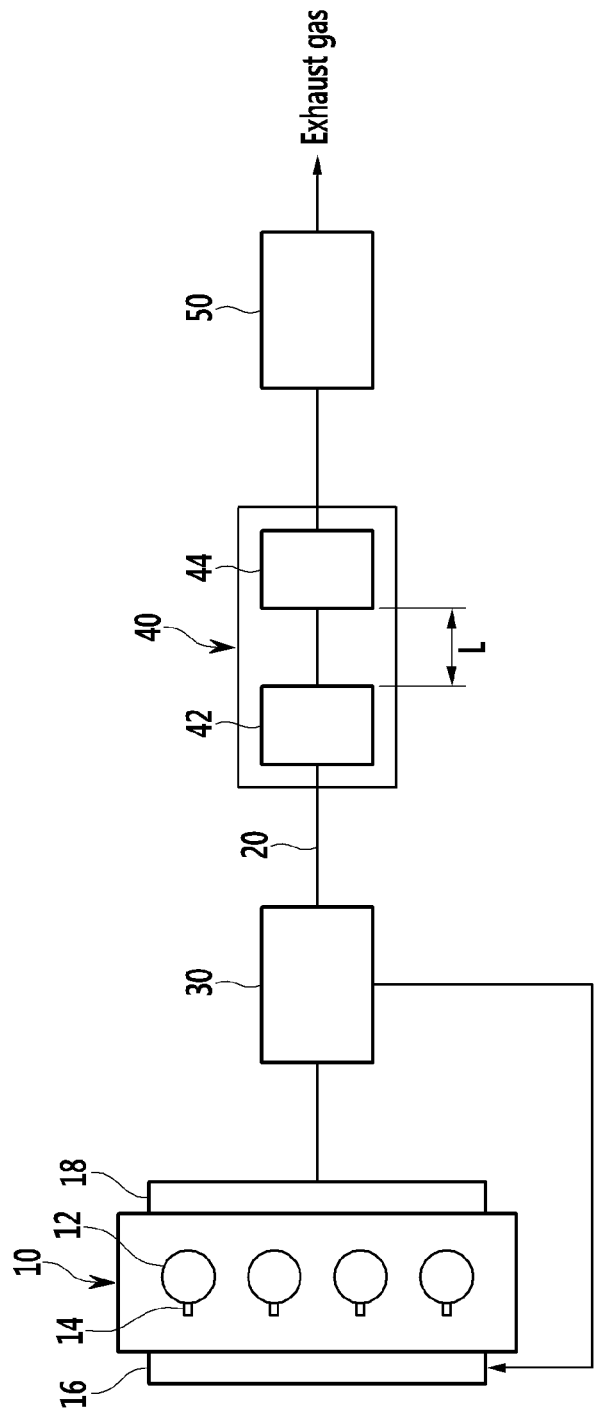
FIG. 1 is a schematic diagram of an apparatus for purifying an exhaust gas according to an exemplary embodiment in the present disclosure.

The present disclosure will be described more fully hereinafter with reference to the accompanying drawings, in which exemplary embodiments are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In the following description, dividing names of components into first, second and the like is to divide the names because the names of the components are the same as each other and an order thereof is not particularly limited.

FIG. 1 is a schematic diagram of an apparatus for purifying an exhaust gas according to an exemplary embodiment in the present disclosure.

As shown in FIG. 1, the apparatus for purifying an exhaust gas according to the present exemplary embodiment includes an engine 10, an exhaust pipe 20, an exhaust gas recirculation (EGR) apparatus 30, a catalytic converter 40 and a selective catalytic reduction (SCR) device 50.

The engine 10 burns an air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in the combustion process is gathered in the exhaust manifold 18 to be exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The catalytic converter 40 and the SCR device 50 are mounted on the exhaust pipe 20 so as to remove pollutants in the exhaust gas.

The EGR apparatus 30 is mounted on the exhaust pipe 20 and supplies a portion of the exhaust gas exhausted from the engine 10 back to the engine 10 therethrough. In addition, the EGR apparatus 30 is connected to the intake manifold 16 so as to control the combustion temperature by mixing a portion of the exhaust gas with the air. Such control of the combustion temperature is performed by controlling the amount of the exhaust gas supplied back to the intake manifold 16 by control of the controller (not shown). Therefore, a recirculation valve (not shown) controlled by the controller may be mounted on a line connecting the exhaust gas recirculation apparatus 30 and the intake manifold 16.

The catalytic converter 40 is mounted on the exhaust pipe 20 downstream of the EGR apparatus 30 and includes a lean NOx trap (LNT) device 42 and a catalyzed particulate filter (CPF) 44. The LNT device 42 and the CPF 44 are sequentially disposed within the catalytic converter 40.

The LNT device 42 is coated with an LNT catalyst therein. The LNT device 42 absorbs the nitrogen oxide (NOx) contained in the exhaust gas at a lean air/fuel ratio, and releases the absorbed nitrogen oxide and reduces the nitrogen oxide contained in the exhaust gas or the released nitrogen oxide at a rich air/fuel ratio. In addition, the LNT device 42 may oxidize carbon monoxide (CO) and hydrocarbon (HC) contained in the exhaust gas.

Herein, the hydrocarbon represents all compounds consisting of carbon and hydrogen contained in the exhaust gas and the fuel.

The LNT catalyst includes ceria ($CeO_2$), barium (Ba), and a noble metal including platinum (Pt). The ceria and the barium absorb the nitrogen oxide as nitrate, and the noble metal including the platinum oxidizes the nitrogen oxide into nitrate and promotes the oxidation-reduction reaction of nitrogen oxide and carbon monoxide or hydrocarbon.

Figure 2:
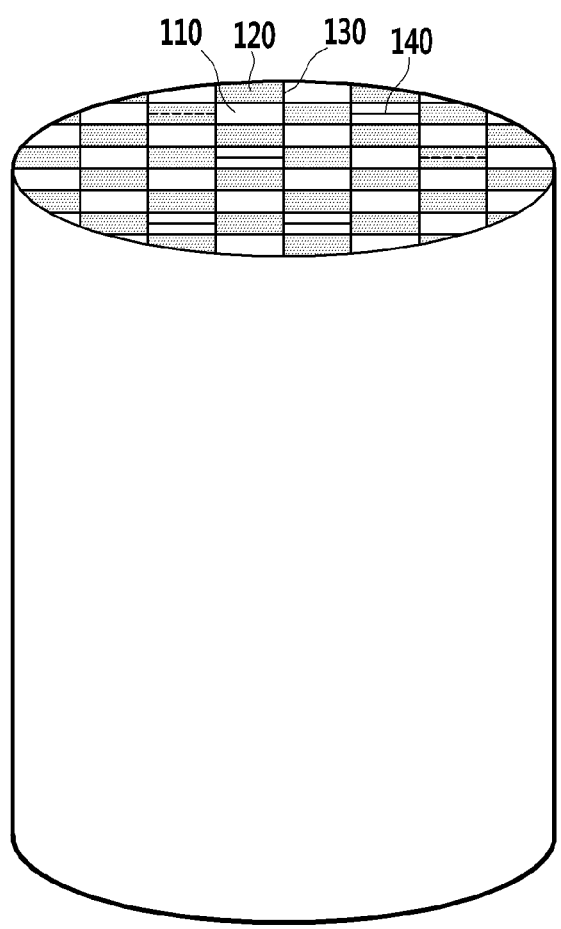
FIG. 2 is a perspective view of a catalyzed particulate filter used in an apparatus for purifying an exhaust gas according to an exemplary embodiment in the present disclosure.
Figure 3:
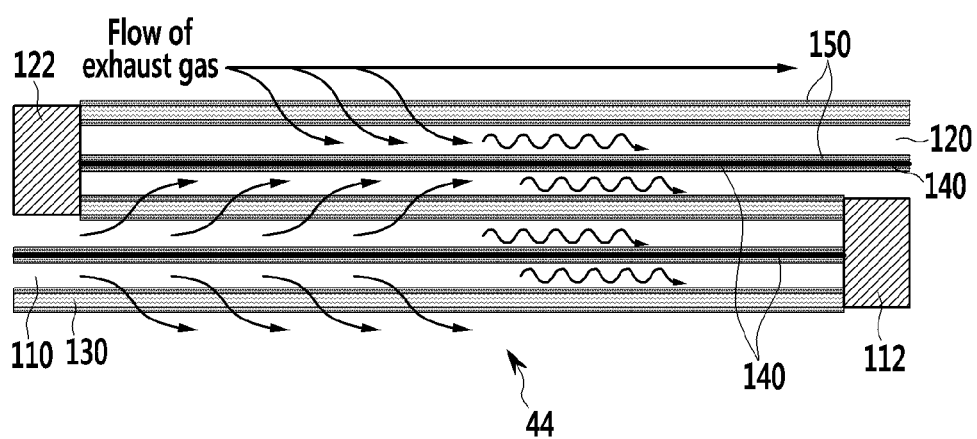
FIG. 3 is a cross-sectional view of the catalyzed particulate filter according to an exemplary embodiment in the present disclosure.
Figure 4:
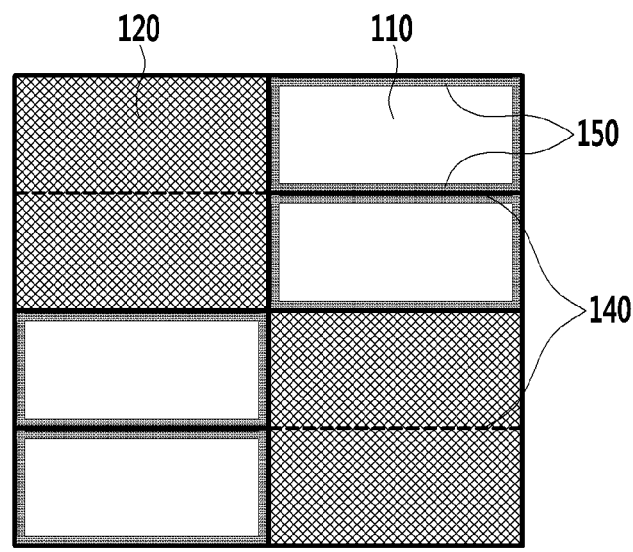
FIG. 4 is a front view illustrating inlet and outlet channels in the catalyzed particulate filter according to the exemplary embodiment in the present disclosure.

The CPF 44 is located within the catalytic converter 40 downstream of the LNT device 42. A distance between an outlet of the LNT device 42 and an inlet of the CPF 44 is set to a distance L. The distance L may be smaller than or equal to 600 mm. The distance L may be larger than or equal to 100 mm. If the distance L is larger than 600 mm, a temperature of the CPF 44 may be too low to secure a regeneration temperature or a desulfurization temperature. If the distance L is smaller than 100 mm, however, the CPF may not completely purify and may exhaust the nitrogen oxide due to high temperature of the CPF 44 under high speed or high load conditions. With reference to FIG. 2 to FIG. 4, the CPF 44 will be described in detail.

FIG. 2 is a perspective view of a catalyzed particulate filter used in an apparatus for purifying an exhaust gas according to an exemplary embodiment in the present disclosure; FIG. 3 is a cross-sectional view of the catalyzed particulate filter according to the present exemplary embodiment; and FIG. 4 is a front view illustrating inlet and outlet channels in the catalyzed particulate filter according to the present exemplary embodiment.

As shown in FIG. 2, the CPF 44 according to the present exemplary embodiment includes at least one inlet channel 110 and at least one outlet channel 120 within a housing. The at least one inlet channel 110 and the at least one outlet channel 120 are separated from each other by walls 130. In addition, supports 140 may be located within at least one among the at least one inlet channel 110 and the at least one outlet channel 120.

In this specification, the inlet channel 110 and the outlet channel 120 may be collectively referred to as 'cells'. Although, in this specification, the housing has a cylindrical shape and the cells have a rectangular shape, the housing and the cells are not limited to such shapes. In addition, the housing may be a housing of the catalytic converter, but is not limited thereto.

Referring to FIGS. 3 and 4, the inlet channel 110 extends along a flow of the exhaust gas. A front end of the inlet channel 110 is open so that the exhaust gas is introduced into the CPF 44 through the inlet channel 110. A rear end of the inlet channel 110 is blocked by a first plug 112. Therefore, the exhaust gas in the CPF 44 cannot flow out of the CPF 44 through the inlet channel 110.

The outlet channel 120 extends along the flow of the exhaust gas and may be placed parallel to the inlet channel 110. At least one inlet channel 110 is located around the outlet channel 120.

For example, if the cells have a rectangular shape, each outlet channel 120 is surrounded by walls 130 on four sides. At least one of the four sides is located between each outlet channel 120 and a neighboring inlet channel 110. If the cells have a rectangular shape, each outlet channel 120 may be surrounded by four neighboring inlet channels 110 and each inlet channel 110 may be surrounded by four neighboring outlet channels 120, but the present disclosure is not limited thereto.

Since a front end of the outlet channel 120 is blocked by a second plug 122, the exhaust gas cannot flow into the CPF 44 through the outlet channel 120. A rear end of the outlet channel 120 is open so that the exhaust gas in the CPF 44 flows out of the CPF 44 through the outlet channel 120.

A wall 130 is placed between neighboring inlet and outlet channels 110 and 120 to define the boundary between them. The wall 130 may be a porous wall 130 with at least one micropore in it. The porous wall 130 allows the neighboring inlet and outlet channels 110 and 120 to fluidly communicate with each other. Thus, the exhaust gas introduced into the inlet channel 110 may move to the outlet channel 120 through the porous wall 130. Moreover, the porous wall 130 prevents particulate matter in the exhaust gas from passing therethrough. When the exhaust gas moves from the inlet channel 110 to the outlet channel 120 through the porous wall 130, the particulate matter in the exhaust gas is filtered through the porous wall 130. The porous wall 130 may be made from aluminum titanate, codierite, silicon carbide, etc.

The support 140 may be located within at least one among the at least one inlet channel 110 and the at least one outlet channel 120. The support 140 may be located only within the at least one inlet channel 110 or only within the at least one outlet channel 120. Although FIGS. 1 through 3 illustrate that the support 140 extends parallel to the direction in which the inlet channel 110 and/or the outlet channel 120 extend, the present disclosure is not limited thereto. That is, the support 140 may extend perpendicularly or obliquely to the direction in which the inlet channel 110 and/or the outlet channel 120 extend. In the case that the support 140 extends perpendicularly or obliquely to the direction in which the inlet channel 110 and/or the outlet channel 120 extend, at least one of the two ends of the support 140 may not come into contact with the porous wall 130 that separates the cells from one another. In the case that the support 140 extends parallel to the direction in which the inlet channel 110 and/or the outlet channel 120 extend, the support 140 may extend over the entire length of the channel 110 or 120 or extend over part of the length of the channel 110 or 120.

In the CPF 44 according to the present exemplary embodiment, the support 140 is located within the at least one inlet channel 110 and within the at least one outlet channel 120. In addition, the same type of the catalyst 150 is coated on of the porous wall 130 and the support 140. Thus, both of a first catalyst coated on the porous wall 130 and a second catalyst coated on the support 140 are an LNT catalyst 150.

The LNT catalyst 150 coated on the porous wall 130 and the support 140 may include ceria ($CeO_2$), barium (Ba), and a noble metal including platinum (Pt). The LNT catalyst 150 coated on the porous wall 130 and the support 140 and the LNT catalyst coated in the LNT device 42 may have the same ingredients. However, content (wt %) of each ingredient of the LNT catalyst 150 may be different from that of the LNT catalyst coated in the LNT device 42.

In one exemplary embodiment (a vehicle with low or middle displacement volume), the content of the ceria in the LNT catalyst 150 coated on the porous wall 130 and the support 140 is at least 10% higher than that in the LNT catalyst coated in the LNT device 42, and the content of the platinum in the LNT catalyst 150 coated on the porous wall 130 and the support 140 is 10%-50% higher than that in the LNT catalyst coated in the LNT device 42. The LNT catalyst 150 coated on the porous wall 130 and the support 140 is regenerated (it means the LNT catalyst releases and reduces the nitrogen oxide at the rich air/fuel ratio) and desulfurized at a relatively low temperature. Therefore, the ceria content in the LNT catalyst 150 coated on the porous wall 130 and the support 140 is increased so that generation of heat is increased at the rich air/fuel ratio, and the platinum content in the LNT catalyst 150 coated on the porous wall 130 and the support 140 is increased so that generation of heat is increased and reaction of the nitrogen oxide with the carbon monoxide or the hydrocarbon is promoted.

In another exemplary embodiment (a vehicle with high displacement volume), the content of the ceria in the LNT catalyst 150 coated on the porous wall 130 and the support 140 is at least 10% lower than that in the LNT catalyst coated in the LNT device 42, and the content of the barium in the LNT catalyst 150 coated on the porous wall 130 and the support 140 is at least 10% higher than that in the LNT catalyst coated in the LNT device 42. Thereby, the CPF 44 is suitable for absorbing and reducing the nitrogen oxide at a relatively high temperature of 300° C.-450° C.

Meanwhile, the support 140 is provided to hold the catalyst 150 in place, rather than serving as a filter. Thus, the support 140 is not necessarily made from a porous material. That is, the support 140 may be made from the same material as the porous wall 130 or a different material. Even in the case that the support 140 is made from a porous material, the exhaust gas mostly moves along the support 140 and the wall 130 without passing through the support 140, because there is little difference in pressure between the two parts of the channel 110 or 120 separated by the support 140. Also, the support 140 does not need to be thick since it is not required to serve as a filter. That is, the support 140 may be thinner than the wall 130, which minimizes an increase in back pressure.

Figure 5:
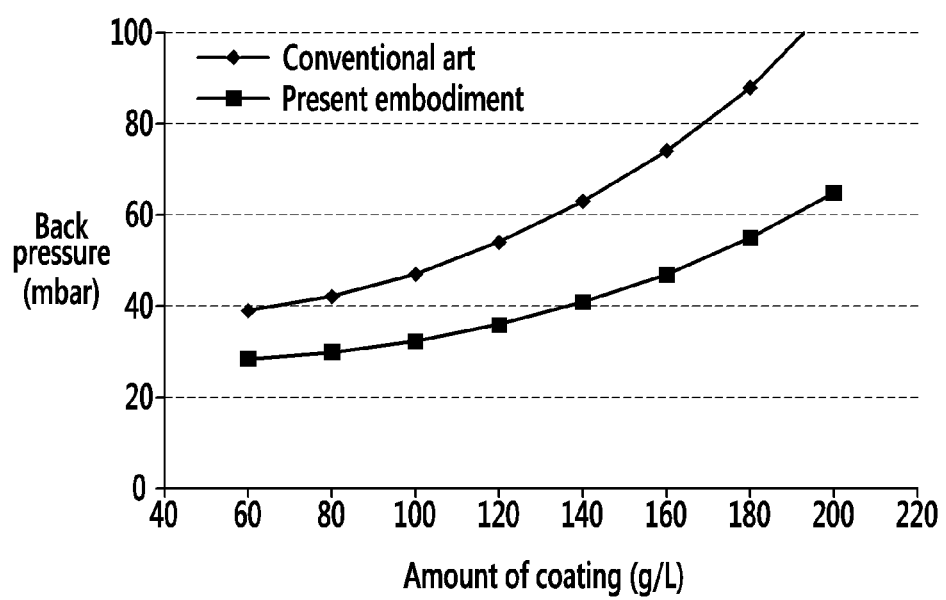
FIG. 5 is a graph illustrating back pressure vs. the amount of catalyst.

FIG. 5 is a graph illustrating back pressure vs. the amount of catalyst.

As shown in FIG. 5, in order to reduce the back pressure, it is difficult to coat the catalyst greater than or equal to 120 g/L in the CPF according to conventional arts, but the catalyst of 180 g/L can be coated in the CPF 44 according to the present exemplary embodiment. That is, since the present exemplary embodiment can minimize an increase in the back pressure and increase the amount of the catalyst 150 coated in the CPF 44, the purifying performance of the exhaust gas may be improved.

As described above, since the CPF 44 includes the LNT catalyst 150, the CPF 44 can absorb the NOx contained in the exhaust gas at a lean air/fuel ratio, release the absorbed NOx at a rich air/fuel ratio, and reduce the nitrogen oxide contained in the exhaust gas or the released NOx or to generate ammonia ($NH_3$). In addition, the CPF 44 oxidizes the carbon monoxide (CO) and the hydrocarbon (HC) contained in the exhaust gas and traps the particulate matter in the exhaust gas.

Referring to FIG. 1 again, the SCR device 50 is mounted on the exhaust pipe 20 downstream of the catalytic converter 40. The SCR device 50 includes an SCR catalyst coated therein so as to further reduce the nitrogen oxide if nitrogen oxide is emitted from the catalytic converter 40. That is, the SCR device 50 reduces the nitrogen oxide in the exhaust gas by using the ammonia generated in the catalytic converter 40. The SCR device 50 may be mounted physically apart from the catalytic converter 40.

Operation of the apparatus for purifying an exhaust gas according to another exemplary embodiment in the present disclosure will hereinafter be described.

The nitrogen oxide in the exhaust gas is mainly absorbed in the LNT device 42 at a normal driving condition (a condition where a temperature of the exhaust gas is not excessively high). If the vehicle runs at high speed or high load condition, the LNT device 42 may not absorb the entirety of the nitrogen oxide due to the high temperature of the exhaust gas. At this time, since the CPF 44 is disposed at a downstream of and apart from the LNT device 42, a temperature of the CPF 44 is lower than that of the LNT device 42. Therefore, the CPF 44 can absorb the nitrogen oxide in the exhaust gas at the high temperature or the high load condition. In addition, the heat capacity of the CPF 44 is large and thus the temperature change of the CPF 44 is small. Therefore, thermal release of the nitrogen oxide from the CPF 44 decreases at the high temperature or the high load condition. Further, because most of the CO/HC which reacts competitively against the nitrogen oxide is removed at the LNT device 42, absorption efficiency of the nitrogen oxide may be enhanced.

Since the SCR device 50 is mounted on the exhaust pipe 20 downstream of the catalytic converter 40, the nitrogen oxide in the exhaust gas can be finally removed by using the ammonia generated at the catalytic converter 40.

Figure 6:
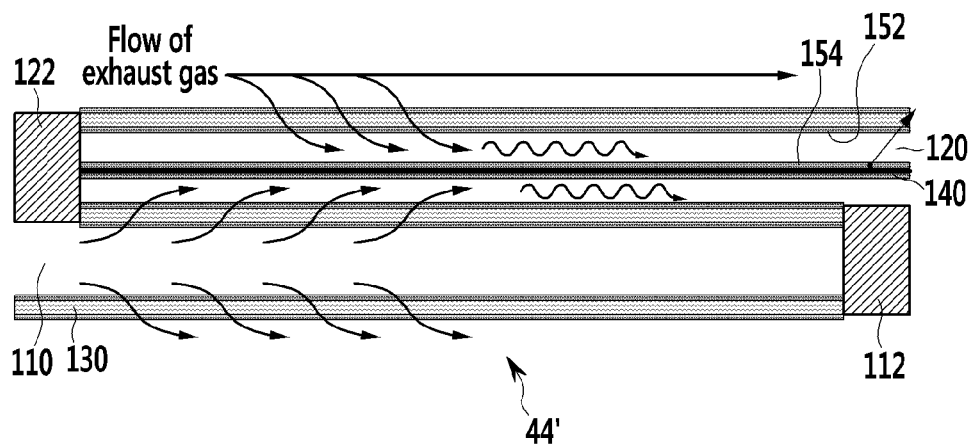
FIG. 6 is a cross-sectional view of the catalyzed particulate filter according to another exemplary embodiment in the present disclosure.

FIG. 6 is a cross-sectional view of the catalyzed particulate filter according to another exemplary embodiment in the present disclosure.

Other constituent elements of the present exemplary embodiment are the same as those of the previous exemplary embodiment except a layout of the CPF. Therefore, the layout of the CPF will be described in detail.

In the CPF 44' according to the present exemplary embodiment, the support 140 is located only within the at least one outlet channel 120. In addition, the first catalyst 152 coated on the porous wall 130 is the LNT catalyst and the second catalyst 154 coated on the support 140 is the SCR catalyst.

Since the SCR catalyst is coated within the CPF 44' according to the present exemplary embodiment, an activation temperature of the SCR catalyst can be easily secured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for purifying an exhaust gas passing through an exhaust pipe, the apparatus comprising
   a catalytic converter disposed on the exhaust pipe and provided with a lean NOx trap (LNT) device having an LNT catalyst coated therein, and
   a catalyzed particulate filter (CPF) having a catalyst coated therein and sequentially disposed with the LNT device in the catalytic converter, wherein the CPF comprises
at least one inlet channel extending in a longitudinal direction, having a first end into which fluid flows and a blocked second end,
at least one outlet channel extending in the longitudinal direction, having a blocked first end and a second end through which the fluid flows out,
at least one porous wall defining a boundary between neighboring inlet and outlet channels and that extends in the longitudinal direction, and
a support with the catalyst coating thereon,
wherein the support is located within the at least one inlet channel, and within the at least one outlet channel,
wherein the catalyst includes a first catalyst coated on the porous wall and a second catalyst coated on the support, and both of the first catalyst and the second catalyst are LNT catalysts,
wherein an entirety of the LNT catalyst coated in the LNT device and the first and second catalysts includes ceria ($CeO_2$), platinum (Pt), and barium (Ba), and a content of the ceria respectively in the first and second catalysts is at least 10% higher than that in the LNT catalyst in the LNT device, and a content of the platinum respectively in the first and second catalysts is 10%-50% higher than that in the LNT device.

2. An apparatus for purifying an exhaust gas passing through an exhaust pipe, the apparatus comprising
a catalytic converter disposed on the exhaust pipe and provided with a lean NOx trap (LNT) device having an LNT catalyst coated therein, and
a catalyzed particulate filter (CPF) having a catalyst coated therein and sequentially disposed with the LNT device in the catalytic converter,
wherein the CPF comprises
at least one inlet channel extending in a longitudinal direction, having a first end into which fluid flows and a blocked second end,
at least one outlet channel extending in the longitudinal direction, having a blocked first end and a second end through which the fluid flows out,
at least one porous wall defining a boundary between neighboring inlet and outlet channels and that extends in the longitudinal direction, and
a support with the catalyst coating thereon,
wherein the support is located within the at least one inlet channel and within the at least one outlet channel,
wherein the catalyst includes a first catalyst coated on the porous wall and a second catalyst coated on the support, and both of the first catalyst and the second catalyst are LNT catalysts,
wherein an entirety of the LNT catalyst coated in the LNT device and the first and second catalysts include ceria ($CeO_2$), platinum (Pt), and barium (Ba), and a content of the ceria respectively in the first and second catalysts is at least 10% lower than that in the LNT catalyst in the LNT device, and a content of the barium respectively in the first and second catalysts is at least 10% higher than that in the LNT catalyst in the LNT device.

3. The apparatus of claim 1, wherein a distance from an outlet of the LNT device to an inlet of the CPF is less than or equal to 600 mm.

4. The apparatus of claim 1, further comprising an SCR device disposed on the exhaust pipe downstream of the catalytic converter and provided with an SCR catalyst coated therein and reducing nitrogen oxide contained in the exhaust gas using ammonia produced in the catalytic converter.

5. The apparatus of claim 2, wherein a distance from an outlet of the LNT device to an inlet of the CPF is less than or equal to 600 mm.

6. The apparatus of claim 2, further comprising an SCR device disposed on the exhaust pipe downstream of the catalytic converter and provided with an SCR catalyst coated therein and reducing nitrogen oxide contained in the exhaust gas using ammonia produced in the catalytic converter.

* * * * *